United States Patent
Zhu et al.

(10) Patent No.: US 9,507,074 B2
(45) Date of Patent: Nov. 29, 2016

(54) BACKLIGHTING MODULE AND LIGHT GUIDE MODULE BOTH COMPRISING GRADIENT INDEX LENS

(71) Applicant: WISTRON CORP., New Taipei (TW)

(72) Inventors: Yan-Fei Zhu, New Taipei (TW); Chih-Yen Chen, New Taipei (TW)

(73) Assignee: WISTRON CORP., New Taipei (TW)

(*) Notice: Subject to any disclaimer, the term of this patent is extended or adjusted under 35 U.S.C. 154(b) by 115 days.

(21) Appl. No.: 14/666,062

(22) Filed: Mar. 23, 2015

(65) Prior Publication Data

US 2016/0124134 A1    May 5, 2016

(30) Foreign Application Priority Data

Oct. 30, 2014   (CN) .......................... 2014 1 0603127

(51) Int. Cl.
*F21V 8/00*         (2006.01)
(52) U.S. Cl.
CPC ............. *G02B 6/005* (2013.01); *G02B 6/0088* (2013.01)
(58) Field of Classification Search
CPC ............................. G02B 6/005; G02B 6/0088
See application file for complete search history.

(56) References Cited

U.S. PATENT DOCUMENTS

| | | | |
|---|---|---|---|
| 2003/0190126 A1* | 10/2003 | Toyoshima | G02B 5/285 385/120 |
| 2011/0255305 A1* | 10/2011 | Chen | G02B 6/0035 362/619 |
| 2016/0195646 A1* | 7/2016 | Su | G02B 3/0087 362/97.1 |

FOREIGN PATENT DOCUMENTS

CN         100498390 C      12/2007

* cited by examiner

*Primary Examiner* — Mary Ellen Bowman
(74) *Attorney, Agent, or Firm* — Maschoff Brennan

(57) ABSTRACT

A light guide module includes a light guide plate and a gradient index lens. The light guide plate has a light output surface and a light incident surface. The light incident surface is connected to the light output surface. The gradient index lens has a first surface, a second surface and a third surface. The first surface and the second surface are connected to the third surface. The first surface of the gradient index lens is attached to the light output surface. Multiple internal refractive indexes of the gradient index lens are increased gradually from the first surface to the second surface. A minimum refractive index of the multiple internal refractive indexes is less than a refractive index of the light guide plate. The incident light is refracted multiple times within the gradient index lens, and totally reflected back to the light guide plate.

20 Claims, 5 Drawing Sheets

BACKLIGHTING MODULE AND LIGHT GUIDE MODULE BOTH COMPRISING GRADIENT INDEX LENS

CROSS-REFERENCE TO RELATED APPLICATIONS

This non-provisional application claims priority under 35 U.S.C. §119(a) on Patent Application No(s). 201410603127.2 filed in China on Oct. 30, 2014, the entire contents of which are hereby incorporated by reference.

BACKGROUND

1. Technical Field

The disclosure relates to a light guide module and a backlighting module. More particularly, the disclosure relates to light guide module and a backlighting module both with a gradient index lens.

2. Background

Traditionally, an edge-lit backlighting module comprises a light guide plate and a light source. The light source is located at a side of the light guide plate. When light emitted from the light source enters the light guide plate, the light is guided toward a display panel evenly, and an illumination of the display panel is enhanced.

Since a new design concept has been established to make electronic devices (such as tablet computers, laptop computers) and display screens of the electronic devices become smaller in size and lighter in weight, the light guide plate of the edge-lit backlighting module has developed to be miniaturized accordingly. However, when a light incident surface of the light guide plate is smaller than a light emitting surface of the light source, the light incident surface of the light guide plate cannot totally covers the light emitting surface of the light source. Thus, it causes light leakage and reduces the utilization efficiency of the light source.

To solve the above-mentioned problem, the shape of a part of the light guide plate is trapezoidal, i.e wedged-shaped, wherein the light guide plate has two opposite ends, and the end of the light guide plate closer to the light source is thicker than the other end of the light guide plate. Accordingly, an inclined plane of the light guide plate can guide the light back to the light guide plate, and then the light can be output from a light output surface of the light guide plate, to avoid light leakage. However, when the slope of the inclined plane of the light guide plate is too steep, the light guide plate cannot guide the light well to avoid light leakage. When the slope of the inclined plane of the light guide plate is too gentle, a large portion of the light guide plate where cannot output the light becomes larger, such that the manufacturing cost of the light guide plate is increased.

Therefore, manufacturers try to develop a new light guide module in order to avoid light leakage and improve the efficiency of light receiving of the light guide plate relative to the light source.

SUMMARY

One aspect of the disclosure provides a light guide module for matching with a light source light source used to emit an incident light. The light guide module comprises a light guide plate and a gradient index lens. The light guide plate has a light output surface and a light incident surface. The light incident surface is connected to an end of the light output surface, and the light incident surface is adjacent to and faces toward the light source for receiving the incident light. The gradient index lens has a first surface, a second surface and a third surface with two ends which are opposite to each other. The first surface is parallel to and opposite to the second surface. The first surface and the second surface are connected to the two ends of the third surface, respectively. The first surface of the gradient index lens is attached to the light output surface of the light guide plate. Both the third surface of the gradient index lens and the light incident surface of the light guide plate face toward the light source, for receiving the incident light. A plurality of internal refractive indexes of the gradient index lens is increased gradually from the first surface to the second surface. A minimum refractive index of the plurality of internal refractive indexes is less than a refractive index of the light guide plate. Thus, after the incident light enters the gradient index lens, the incident light is refracted a plurality of times within the gradient index lens, and totally reflected back to the light guide plate by the second surface of the gradient index lens.

Another aspect of the disclosure provides a backlighting module which comprises said light guide module and a light source. The light guide module comprises a gradient index lens. The light source has a light emitting surface. The light emitting surface faces toward the light incident surface of the light guide plate and the third surface of the gradient index lens.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
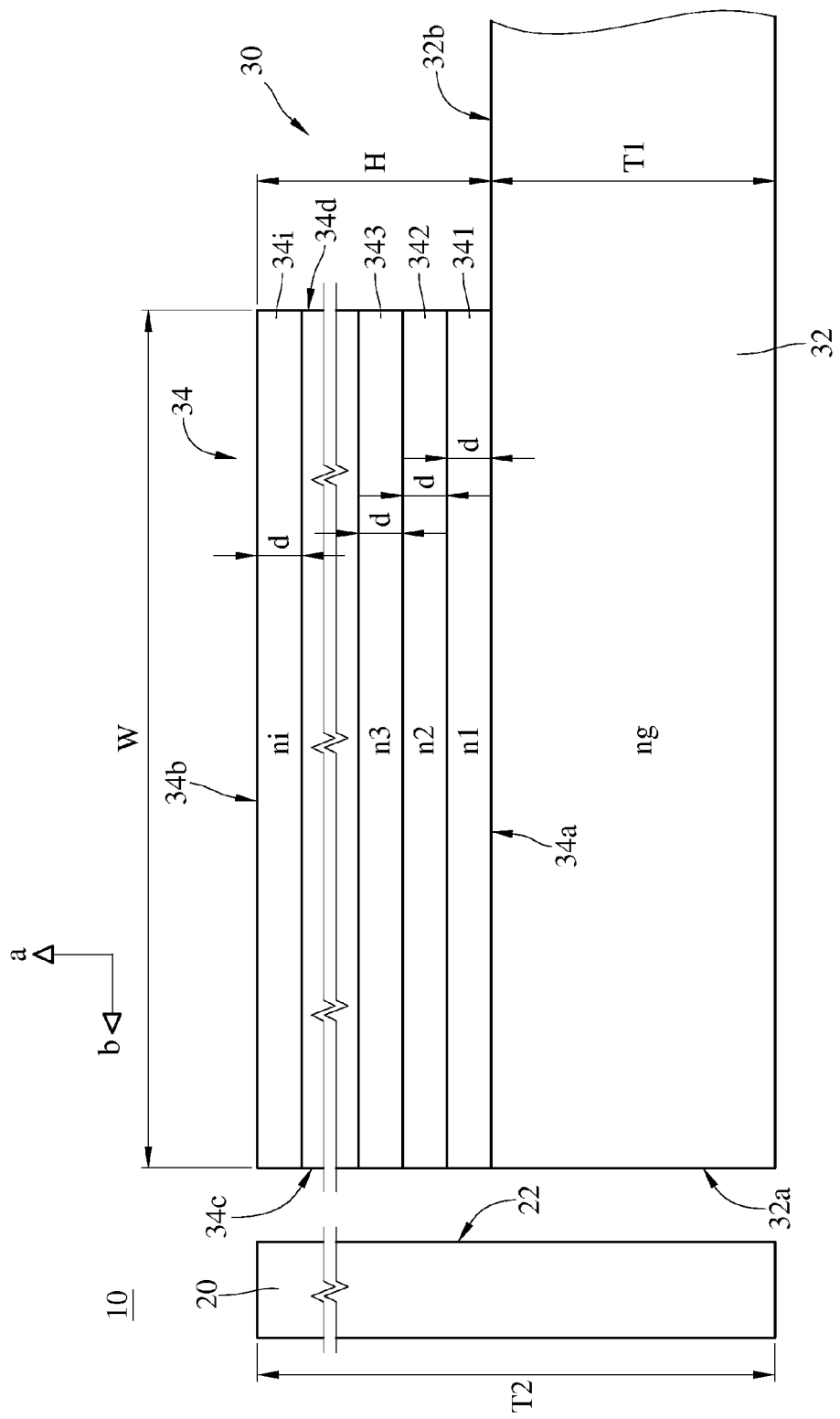
FIG. 1 is a side view of a backlighting module with a gradient index lens according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1 which is a side view of a backlighting module with a gradient index lens according to a first embodiment of the disclosure. As shown in FIG. 1, the backlighting module 10 comprises a light guide module 30 and a light source 20.

The light guide module 30 comprises a light guide plate 32 and a gradient index lens 34. The light guide plate 32 has a light incident surface 32a and a light output surface 32b.

The light incident surface 32a is connected to an end of the light output surface 32b. A refractive index of the light guide plate 32 is ng.

The gradient index lens 34 is attached to the light output surface 32b of the light guide plate 32 and is adjacent to light incident surface 32a. The gradient index lens 34, for example, is manufactured by attachment or co-extrusion. The gradient index lens 34 comprises a plurality of light-transmissive layers. The quantity of the plurality of light-transmissive layers is i, and i≥2. The plurality of light-transmissive layers is stacked up sequentially from the first light-transmissive layer to the i-th light-transmissive layer. The first light-transmissive layer 341 has a first surface 34a which is away from the second light-transmissive layer 342. The i-th light-transmissive layer 34i has a second surface 34b which is away from the first light-transmissive layer 341. A third surface 34c and a fourth surface 34d are formed by the light-transmissive layers 341-34i and face oppositely to each other. The third surface 34c has two ends which are opposite to each other, and the first surface 34a and the second surface 34b are connected to the two ends of the third surface 34c, respectively. In other words, as shown in FIG. 1, the gradient index lens 34 has the first surface 34a and the second surface 34b which are parallel to each other and perpendicular to a vertical direction a, and has the third surface 34c and the fourth surface 34d which are parallel to each other and perpendicular to a horizontal direction b. The vertical direction a is defined to be parallel to a normal direction of the light output surface 32b of the light guide plate 32, and the horizontal direction b is defined to be parallel to a normal direction of the light incident surface 32a of the light guide plate 32.

The light-transmissive layers 341-34i are made of glass or transparent plastic, and the transparent plastic is polycarbonate (PC, and a refractive index of PC is 1.586), polymethyl methacrylate (PMMA, and a refractive index of PMMA is 1.49), methyl methacrylate-styrene copolymers (MS, and a refractive index of MS is 1.564), polystyrene (PS, and a refractive index of PS is 1.492), polyethylene terephthalate (PET, and a refractive index of PET is between 1.59 and 1.6), cyclic olefin copolymer (COC), cyclo olefin polymer (COP), polyethylene naphthalate (PEN) or polylactide (PLA). However, each light-transmissive layer is, but not limited to, made from one material. In other embodiments, for example, each light-transmissive layer is made from at least two materials which are stacked on one another.

The first surface 34a of the first light-transmissive layer 341 is attached to the light output surface 32b of the light guide plate 32, and the light-transmissive layers 341-34i are stacked up sequentially from the first light-transmissive layer 341 to the i-th light-transmissive layer 34i. In this embodiment, both the third surface 34c and the light incident surface 32a face toward the light source 20, and the third surface 34c and the light incident surface 32a are coplanar. However, in other embodiments, the third surface 34c and the light incident surface 32a, for example, are separated from each other by a distance. That is, the third surface 34c and the light incident surface 32a are not coplanar.

Additionally, the light-transmissive layers 341-34i have a plurality of refractive indexes n1-ni respectively, and each refractive index is different from one another. The refractive indexes n1-ni are defined as a plurality of internal refractive indexes of the gradient index lens 34, and the internal refractive indexes of the gradient index lens 34 is increased gradually from the first surface 34a to the second surface 34b. In other words, the refractive indexes n1-ni of the light-transmissive layers 341-34i are increased gradually from the light-transmissive layers 341 to the light-transmissive layers 34i. Moreover, the refractive indexes n1-ni of the light-transmissive layers 341-34i satisfy the following condition: 1<n1<n2< . . . <ni, and ni is the refractive index of the i-th light-transmissive layer 34i.

In this embodiment, all the refractive indexes n1-ni of the light-transmissive layers 341-34i (the internal refractive index of the gradient index lens 34) are between 1.2 and 1.6. However, the refractive indexes n1-ni are not limited to between 1.2 and 1.6. In other embodiments, for example, the refractive indexes n1-ni of the light-transmissive layers 341-34i are not between 1.2 and 1.6. Furthermore, a minimum refractive index (that is, the refractive index n1 of the first light-transmissive layer 341) of the gradient index lens 34 is less than the refractive index ng of the light guide plate 32.

The light source 20 has a light emitting surface 22. The light emitting surface 22 faces toward the light incident surface 32a of the light guide plate 32 and the third surface 34c of the gradient index lens 34. Accordingly, a plurality of beams of incident lights (not shown in FIG. 1) emitted from the light emitting surface 22 of the light source 20 enters the light guide plate 32 and the gradient index lens 34 from the light incident surface 32a and the third surface 34c, with a plurality of incident angles which are different from one another.

Figure 2:
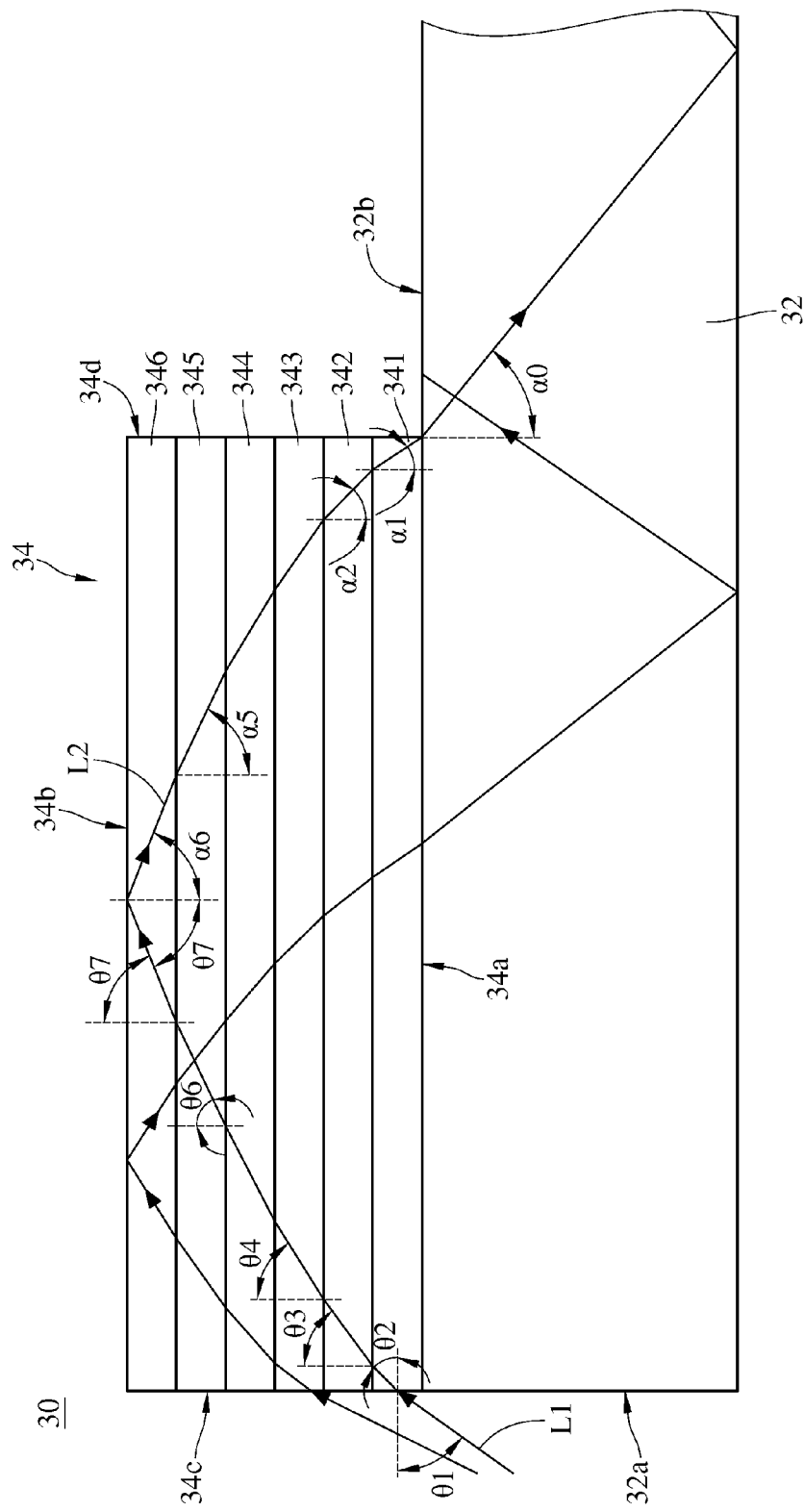
FIG. 2 is a side view of the backlighting module with light travelling inside in FIG. 1.

Please refer to FIG. 2 which is a side view of the backlighting module with light travelling inside in FIG. 1. As shown in FIG. 2, the quantity of the light-transmissive layers 341-34i is six in this embodiment. An incident light L1 enters the gradient index lens 34 from the third surface 34c with an incident angle θ1. Then, the incident light L1 is refracted by the first light-transmissive layer 341 through the sixth light-transmissive layer 346 sequentially, and a plurality of refraction angles θ2-θ7 of the incident light L1 is formed accordingly (the refraction angle θ2 is formed when the incident light L1 leaves the first light-transmissive layer 341, and the refraction angle θ7 is formed when the incident light L1 leaves the fifth light-transmissive layer 345). Relationships between the incident angle θ1 and the refraction angles θ2-θ7 of the incident light L1 are shown in Table 1.

TABLE 1

$\sin\theta_1 = n_1 * \sin\theta_2$
$n_1 * \cos\theta_2 = n_2 * \sin\theta_3$
$n_2 * \sin\theta_3 = n_3 * \sin\theta_4$
. . .
$n_5 * \sin\theta_6 = n_6 * \sin\theta_7$ The refractive indexes n1-n6 of the light-transmissive layers 341-346 satisfy the following condition: 1<n1< n2< . . . <ni, such that θ2>θ1, θ3>(90°-θ2), θ4>θ3, . . . , θ7>θ6. In other words, the refraction angles θ2-θ7 of the incident light L1 are increased gradually from the light-transmissive layer 341 to the light-transmissive layer 346, and the refraction angle θ7 is greater than a total reflection angle of the second surface 34b of the light-transmissive layer 346, such that the incident light L is reflected by the second surface 34b to generate a reflected light L2.

The reflected angle of the reflected light L2 is α6. After the reflected light L2 is refracted by the sixth light-transmissive layer 346 through the first light-transmissive layer 341, a plurality of refraction angles α5-α0 of the reflected light L2 are formed sequentially (the refraction angle α5 is formed when the reflected light L2 leaves the sixth light-transmissive layer 346, and refraction angle α0 is formed when the reflected light L2 leaves the first light-transmissive layer 341). Relationships between the refraction angle θ7, the reflected angle α6 and the refraction angles α5-α0 are shown in the Table 2.

TABLE 2

α6 = θ7
n6*sinα6 = n5*sinα5
...
n2*sinα2 = n1*sinα1
n1*sinα1 = ng*sinα0

The refractive indexes n1-n6 of the light-transmissive layers 341-346 satisfy the following condition: 1<n1< n2<...<ni, and n1<ng, such that α6>...>α1 and α1<α0. In other words, the refraction angles α5-α0 of the reflected light L2 are decreased gradually from the light-transmissive layer 346 to the light-transmissive layer 341, to prevent the reflected light L2 from leaving the gradient index lens 34 from the fourth surface 34d and improve an efficiency of light collection of the gradient index lens 34 by guiding the light emitted from the light source 20 back to the light guide plate 32.

To further improve the light collection efficiency of the gradient index lens 34, the size of the gradient index lens 34 can be predetermined by manufacturers before the gradient index lens 34 is manufactured. Please refer to FIG. 1 again, the gradient index lens has a thickness H along the vertical direction a and a width W along the horizontal direction b. The thickness H and the width W of the gradient index lens 34 satisfy the following condition: W≥10H, to prevent the reflected light L2 (as shown in FIG. 2) from leaving the gradient index lens 34 from the fourth surface 34d, and improve the efficiency of light collection of the gradient index lens 34 by guiding the light emitted from the light source 20 back to the light guide plate 32.

Moreover, as shown in FIG. 2, the refraction angle α0 (formed when the reflected light L2 leaves the first light-transmissive layer 341) is greater than the refraction angle α1 (formed when the reflected light L2 leaves the second light-transmissive layer 342). Therefore, the light emitted from the light source 20 is guided to be not only within the light guide plate 32 but also farther away from the light source 20, thereby evenly distributing the light while outputting from the light guide plate 32.

The backlighting module 10 comprising the gradient index lens 34 according to another embodiment is compared with a backlighting module with a trapezoidal light guide plate taken as a control group according to prior art as follows. In one embodiment, a thickness T1 of the light guide plate 32 is 0.3 millimeters, a thickness T2 of the light source 20 is 0.6 millimeters, the height H of the gradient index lens 34 is 0.3 millimeters, the width W of the gradient index lens 34 is 3.529 millimeters, the refractive index ng of the light guide plate 32 is 1.49, the quantity of the light-transmissive layers 341-34i is 10, the refractive index n1 of the first light-transmissive layer 341 is 1.46, the refractive index n10 of the tenth light-transmissive layer 3410 (not shown in FIGs.) is 1.595, the refractive indexes n1-n10 are increased gradually from the first light-transmissive layer 341 to the tenth light-transmissive layer 3410, and a difference of a value between every two refractive indexes of every two of the light-transmissive layer which are neighboring to each other is a constant (0.015). A height and a width of the backlighting module with the trapezoidal light guide plate are the same as the height H and the width W of the gradient index lens 34, respectively.

Compared with the backlighting module according to the prior art, when luminous fluxes of the backlighting module 10 are increased from 11.2503 lumens (lm) to 12.2963 lm in this embodiment, average illuminance of the backlighting module 10 are increased from 1.25E+06 lux (lx) to 1.36E+06 lx.

However, the difference between every two refractive indexes of every two of the light-transmissive layer which are neighboring to each other is, but not limited to, a constant. In other embodiments, for example, the differences of values between every two refractive indexes of every two of the light-transmissive layers which are neighboring to each other are different from one another.

Then, please refer to Table 3. Relationships between the quantity i of the light-transmissive layers 341-34i, the width W of the gradient index lens 34 and a light receiving efficiency (i.e., a ratio of the light received by the light guide plate 32 to the light emitted from the light guide plate 32) of the light guide plate 32 are shown in Table 3.

TABLE 3

| H = 100 um, n1 = 1.49, ni = 1.59, ng = 1.59 | | | |
|---|---|---|---|
| i (quantity of light-transmissive layer) | | | light receiving efficiency |
| 100 | 20 | 10 | |
| W(um) 944.4793 | 1034.875 | 1161.58551 | 99.70% |
| 799.6239 | 845.5036 | 905.645369 | 98.64% |
| 684.794 | 717.5187 | 759.273713 | 96.85% |
| 592.0844 | 618.1258 | 651.017353 | 94.32% |
| 516.9955 | 538.7979 | 566.211627 | 91.08% |
| 455.8915 | 474.6818 | 498.254802 | 87.15% |
| 405.8493 | 422.3578 | 443.042595 | 82.57% |
| 364.5935 | 379.3062 | 397.72736 | 77.36% |
| 330.3943 | 343.6602 | 360.262587 | 71.58% |
| 301.9575 | 314.0421 | 329.161658 | 65.25% |
| 278.3259 | 289.4404 | 303.343528 | 58.44% |
| 258.8002 | 269.1195 | 282.02624 | 51.18% |
| 242.8776 | 252.552 | 264.650948 | 43.55% |
| 230.2047 | 239.3676 | 250.826266 | 35.58% |
| 220.5407 | 229.3147 | 240.286363 | 27.36% |
| 213.7292 | 222.2295 | 232.858576 | 18.93% |
| 209.6754 | 218.0128 | 228.438309 | 10.37% |
| 208.3292 | 216.6127 | 226.970532 | 1.73% |

As shown in Table 3, the more the quantity of the light-transmissive layers 341-34i is, the greater the width W of the gradient index lens 34 is. In other words, a portion of the light guide plate 32 where can output the light becomes larger. Additionally, when W>10H, the efficiency of light receiving of the light guide plate 32 is about 99% or even greater than 99%.

Figure 3:
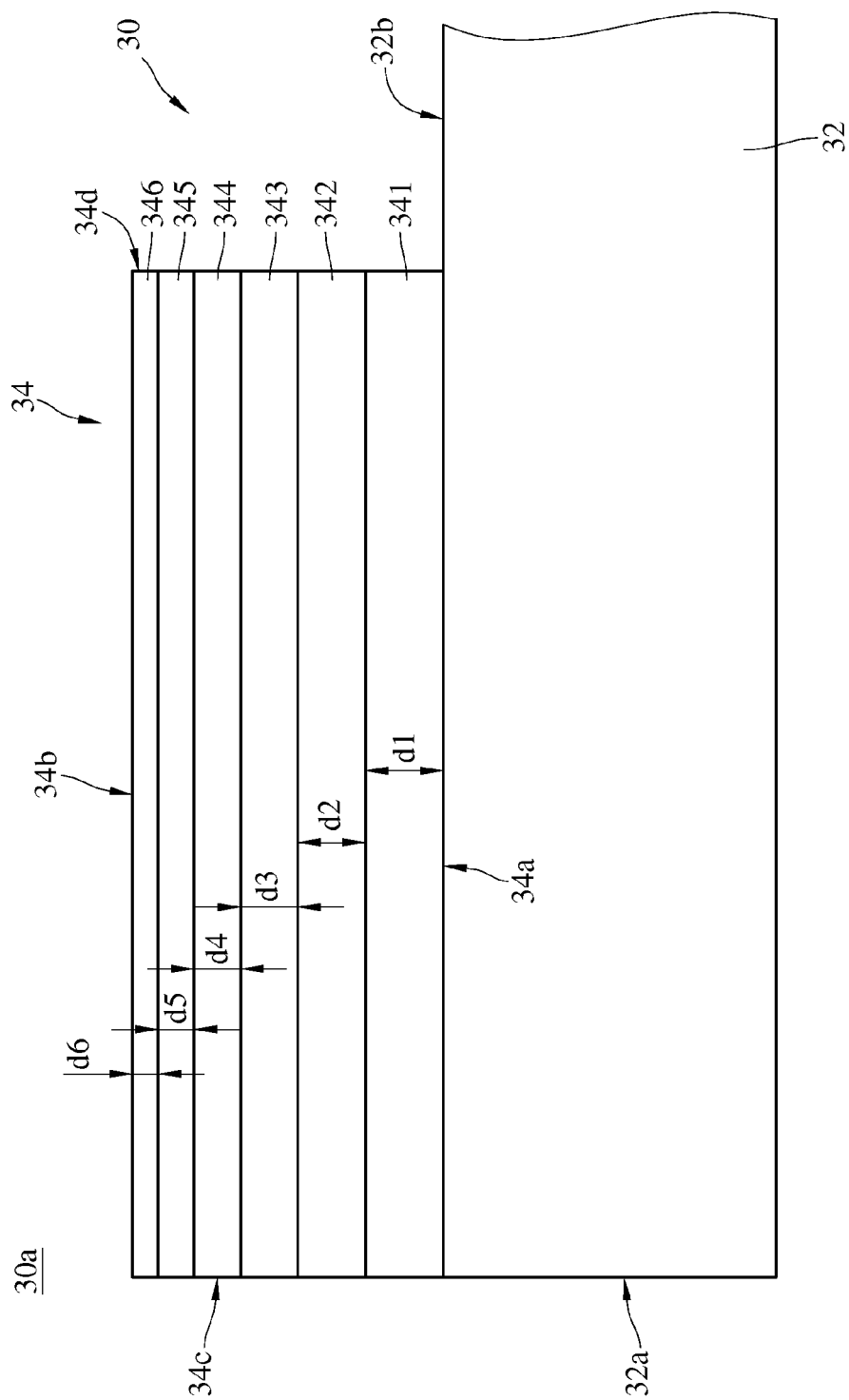
FIG. 3 is a side view of a backlighting module with a gradient index lens according to a second embodiment of the disclosure.

The thicknesses of the light-transmissive layers 341-346 are the same in the first embodiment in FIG. 1. However, please refer to FIG. 3, which is a side view of a backlighting module with a gradient index lens according to a second embodiment of the disclosure. Different from the first embodiment in FIG. 1, thicknesses d1-d6 of the light-transmissive layers 341-346 of the light guide module 30a are different from one another in this embodiment. As shown in FIG. 3, the thicknesses d1-d6 of the light-transmissive layers 341-346 are decreased from the first light-transmissive layer 341 to the sixth light-transmissive layers 346. Furthermore, the thicknesses d1-d6 of the light-transmissive layers 341-346 satisfy the following condition: d1<d2<...<d6. In this embodiment, the quantity of the light-transmissive layers 341-34i is six. However, the quantity of the light-transmissive layers 341-34$i$ is not limited to six. In other embodiments, for example, the quantity of the light-transmissive layers 341-34$i$ is i, and the thicknesses d1-di of the light-transmissive layers 341-34$i$ satisfy the following condition: d1<d2< . . . <di.

Figure 4:
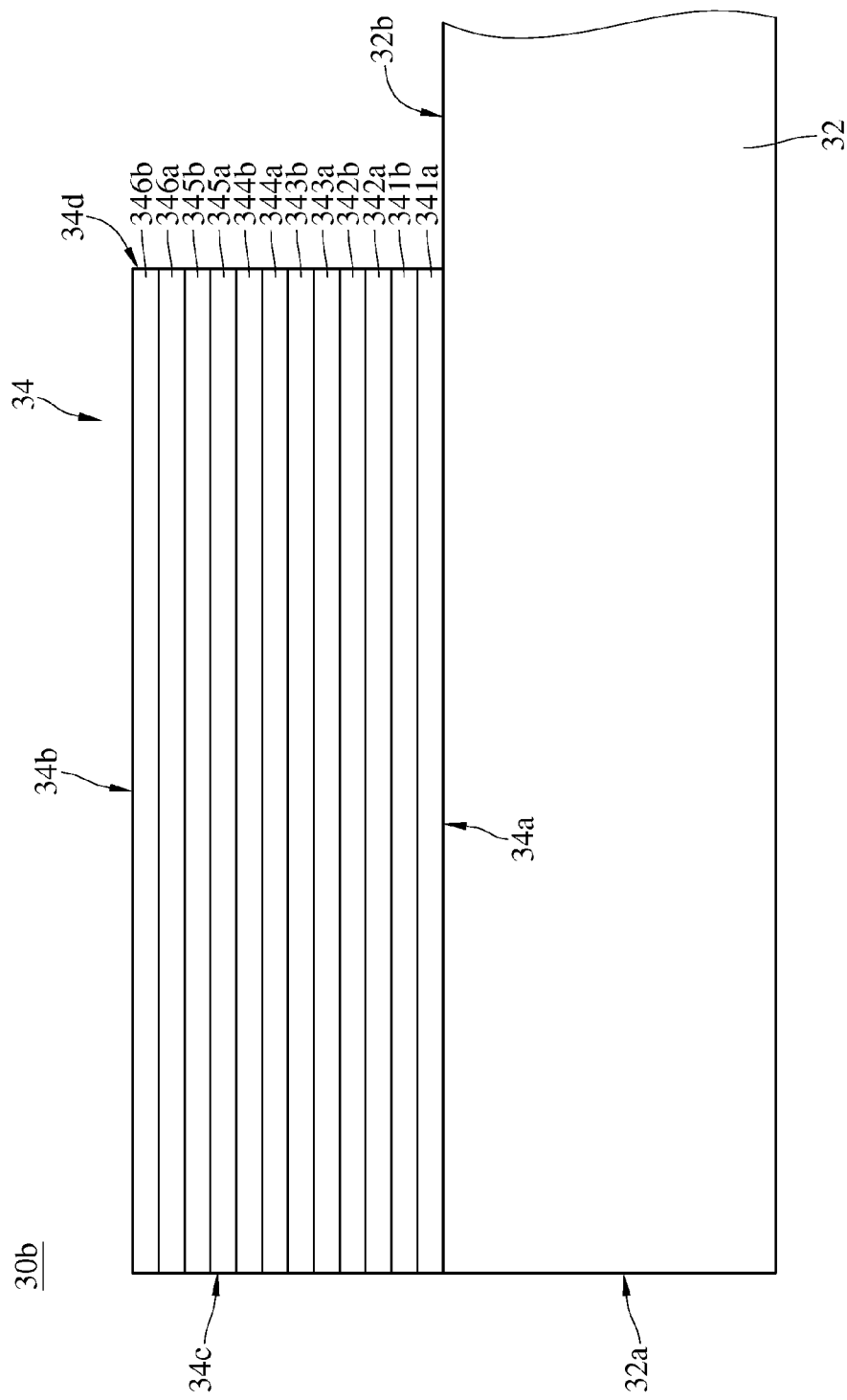
FIG. 4 is a side view of a backlighting module with a gradient index lens according to a third embodiment of the disclosure.

Each of the light-transmissive layers 341-346 is made from one material in FIG. 1. However, please refer to FIG. 4 which is a side view of a backlighting module with a gradient index lens according to a third embodiment of the disclosure. Different from the first embodiment in FIG. 1, each of the light-transmissive layers 341-346 of the light guide module 30$b$ is made from at least two materials, and the materials are stacked on one another. In other words, the first light-transmissive layers 341-346 comprise first material layers 341$a$-346$a$ and second material layers 341$b$-346$b$, respectively. A sum of all the first material layers 341$a$-346$a$ and the second material layers 341$b$-346$b$ is less than 0.25λ, (λ is a wavelength of an incident light which enters the gradient index lens 34 from the third surface 34$c$). For example, in this embodiment, all the first material layer 341$a$-346$a$ are made from PC, and all the second material layer 341$b$-346$b$ are made from PMMA. However, in other embodiments, all the first material layer 341$a$-346$a$ can be made from PC, and all the second material layer 341$b$-346$b$ are made from PLA, all the first material layer 341$a$-346$a$ can be made from made from PMMA and all the second material layer 341$b$-346$b$ can be made from PS, or all the first material layer 341$a$-346$a$ can be made from PMMA and all the second material layer 341$b$-346$b$ can be made from MS.

Figure 5:
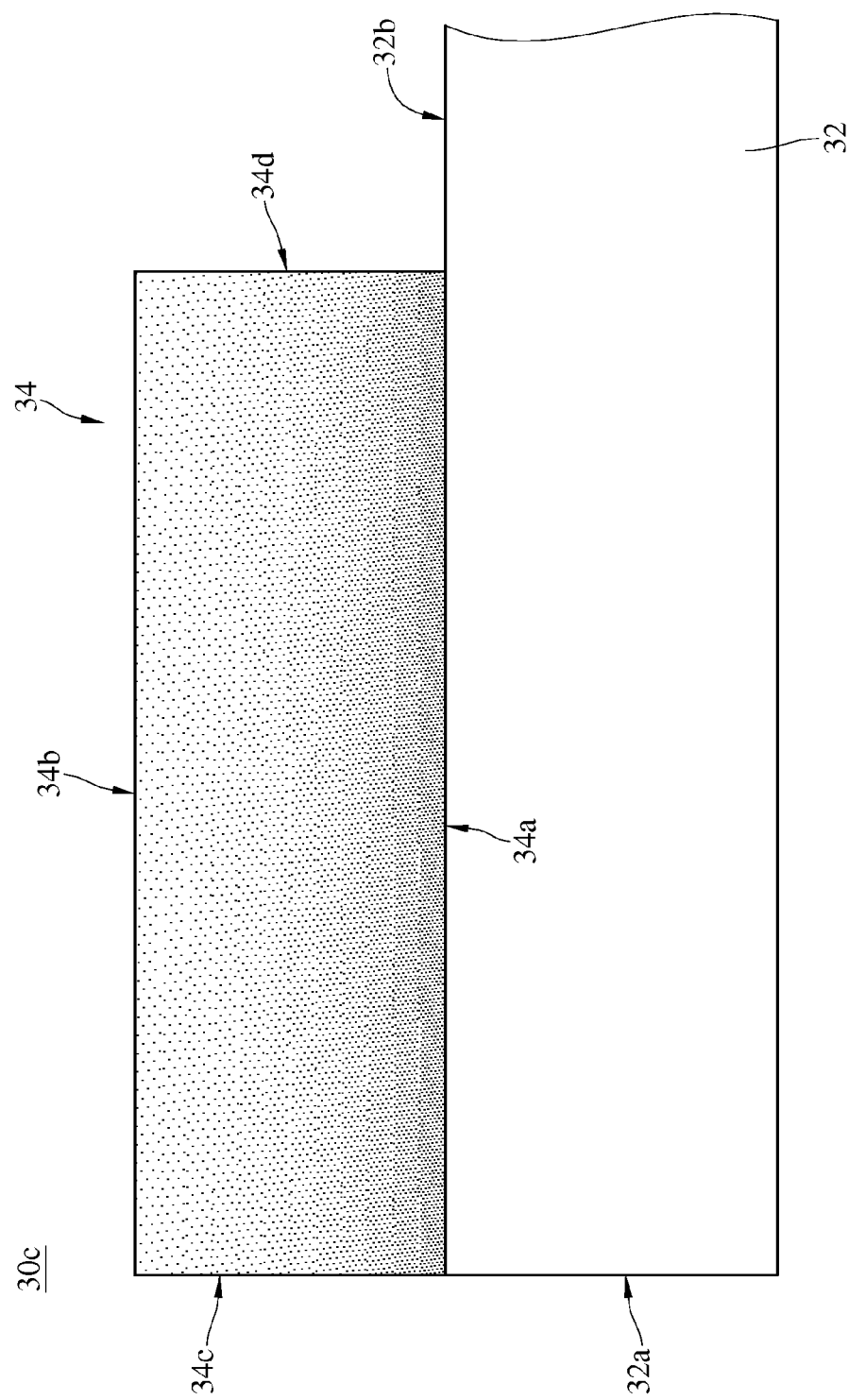
FIG. 5 is a side view of a backlighting module with a gradient index lens according to a fourth embodiment of the disclosure.

The quantity of the light-transmissive layers 341-34$i$ is more than one in the first embodiment in FIG. 1. However, please refer to FIG. 5 which is a side view of a backlighting module with a gradient index lens according to a fourth embodiment of the disclosure. Different from the first embodiment in FIG. 1, the quantity of the light-transmissive layers 341-34$i$ of the gradient index lens 34 is 1 as shown in FIG. 5. Furthermore, the gradient index lens 34 is manufactured by ion implantation. An ion concentration of the gradient index lens 34 is increased or decreased gradually from the first surface 34$a$ to the second surface 34$b$ of the gradient index lens 34.

According to the material characteristic of the gradient index lens 34, the ion concentration is directly proportional or inversely proportional to the refractive index of the gradient index lens 34. In this embodiment, the ion concentration is directly proportional or inversely proportional to the refractive index of the gradient index lens 34. Accordingly, although the quantity of the light-transmissive layers 341-34$i$ is one, the internal refractive index of the gradient index lens 34 is increased gradually from the first surface 34$a$ to the second surface 34$b$, and the minimum refractive index of the gradient index lens 34 is less than the refractive index of the light guide plate 32, Thus, the second surface 34$b$ of the gradient index lens 34 totally reflects the incident light (entering the light guide plate 32 from the third surface 34$c$) back to the light guide plate 32.

According to the light guide module and the backlighting module both comprising the gradient index lens of the disclosure, since the gradient index lens is stacked on the light output surface of the light guide plate and close to the light incident surface, the light receiving efficiency of the light guide plate can be improved when the light incident surface of the light guide plate totally cannot cover the light emitting surface of the light source. Moreover, the internal refractive indexes of the gradient index lens are increased from the first surface to the second surface, and the minimum refractive index is less than the refractive index of the light guide plate, such that the incident light (i.e., light entering the light guide plate 32 from the third surface 34$c$) is totally reflected back to the light guide plate by the second surface of the gradient index lens, thereby improving the light receiving efficiency of the light guide plate.

The disclosure will become more fully understood from the said embodiment for illustration only and thus does not limit the disclosure. Any modifications within the spirit and category of the disclosure fall in the scope of the disclosure.

What is claimed is:

1. A light guide module, configured to be adjacent to a light source capable of emitting an incident light, comprising:
a light guide plate having a light output surface and an light incident surface, the light incident surface being connected to an end of the light output surface, and the light incident surface being adjacent to and facing toward the light source for receiving the incident light; and
a gradient index lens having a first surface, a second surface and a third surface with two ends which are opposite to each other, the first surface being parallel to and opposite to the second surface, the first surface and the second surface being connected to the two ends of the third surface, respectively, the first surface of the gradient index lens being attached to the light output surface of the light guide plate, and both the third surface of the gradient index lens and the light incident surface of the light guide plate facing toward the light source for receiving the incident light;
wherein a plurality of internal refractive indexes of the gradient index lens is increased gradually from the first surface to the second surface, a minimum refractive index of the plurality of internal refractive indexes is less than a refractive index of the light guide plate, such that after the incident light enters the gradient index lens, the incident light is refracted a plurality of times within the gradient index lens, and totally reflected back to the light guide plate by the second surface of the gradient index lens.

2. The light guide module according to claim 1, wherein the gradient index lens comprises a plurality of light-transmissive layers, the quantity of the plurality of light-transmissive layers is i, i≥2, the plurality of light-transmissive layers is stacked up sequentially from the first light-transmissive layer to the i-th light-transmissive layer, the plurality of light-transmissive layers has a plurality of refractive indexes respectively, each refractive index is different from one another, and the plurality of refractive indexes satisfies the following condition:

$$1<n1<n2< \ldots <ni;$$

wherein ni is a refractive index of the i-th light-transmissive layer.

3. The light guide module according to claim 2, wherein the light guide module satisfies the following condition:

$$1.2<ni<1.6.$$

4. The light guide module according to claim 2, wherein the refractive index of the light guide plate is ng, and the light guide module satisfies the following condition:

$$n1<ng.$$

5. The light guide module according to claim 2, wherein each light-transmissive layer is made from at least one material, and when the quantity of the at least one material is more than one, the materials are stacked on one another.

6. The light guide module according to claim 5, wherein a thickness of one of the plurality of light-transmissive layers is d, a wavelength of the incident light is λ, and when the quantity of the at least one material of each light-transmissive layer is more than one and the materials are stacked on one another, the light guide module satisfies the following condition:

$d<0.25\lambda.$

7. The light guide module according to claim 2, wherein each thickness of each light-transmissive layer is different from one another.

8. The light guide module according to claim 7, wherein the plurality of thicknesses of the plurality of light-transmissive layers is increased or decreased gradually from the first surface to the second surface of the gradient index lens.

9. The light guide module according to claim 2, wherein a difference between every two refractive indexes of every two of the plurality of light-transmissive layer which are neighboring to each other is a constant.

10. The light guide module according to claim 1, wherein the gradient index lens is manufactured by attachment or co-extrusion.

11. The light guide module according to claim 1, wherein the gradient index lens is manufactured by ion implantation, and an ion concentration of the gradient index lens is increased or decreased gradually from the first surface to the second surface of the gradient index lens.

12. The light guide module according to claim 1, wherein a vertical direction is defined to be parallel to a normal direction of the light output surface of the light guide plate, a horizontal direction is defined to be parallel to a normal direction of the light incident surface of the light guide plate, the gradient index lens has a thickness H along the vertical direction, the gradient index lens has a width W along the horizontal direction, and satisfy the following condition:

$W\geq 10H.$

13. The light guide module according to claim 1, wherein the gradient index lens is made of glass or transparent plastic, and the transparent plastic is polycarbonate, polymethyl methacrylate, methyl methacrylate-styrene copolymers, polystyrene, polyethylene terephthalate, cyclic olefin copolymer, cyclo olefin polymer, polyethylene naphthalate or polylactide.

14. The light guide module according to claim 1, wherein the third surface of the gradient index lens and the light incident surface of the light guide plate are co-planar.

15. A backlighting module, comprising:
   a light guide module comprising a gradient index lens according to claim 1; and
   a light source having a light emitting surface, the light emitting surface facing toward the light incident surface of the light guide plate and the third surface of the gradient index lens.

16. The backlighting module according to claim 15, wherein the gradient index lens comprises a plurality of light-transmissive layers, the quantity of the plurality of light-transmissive layers is i, i≥2, the plurality of light-transmissive layers is stacked up sequentially from the first light-transmissive layer to the i-th light-transmissive layer, the plurality of light-transmissive layers has a plurality of refractive indexes respectively, each refractive index is different from one another, and the plurality of refractive indexes satisfies the following condition:

$1<n1<n2<\ldots <ni;$ wherein ni is a refractive index of the i-th light-transmissive layer.

17. The backlighting module according to claim 16, wherein each light-transmissive layer is made from at least one material, and when the quantity of the at least one material is more than one, the materials are stacked on one another.

18. The backlighting module according to claim 16, wherein each thickness of each light-transmissive layer is different from one another.

19. The backlighting module according to claim 18, wherein the plurality of thicknesses of the plurality of light-transmissive layers is increased or decreased gradually from the first surface to the second surface of the gradient index lens.

20. The backlighting module according to claim 16, wherein a difference between every two refractive indexes of every two of the plurality of light-transmissive layer which are neighboring to each other is a constant.

* * * * *